United States Patent [19]
Davis

[11] Patent Number: 5,653,654
[45] Date of Patent: Aug. 5, 1997

[54] BELT INSTALLATION AND REMOVAL TOOL

[76] Inventor: George S. Davis, 4601 Packard Dr. K-142, Nashville, Tenn. 37211

[21] Appl. No.: 502,928

[22] Filed: Jul. 17, 1995

[51] Int. Cl.$^6$ ........................................................ F16H 7/22
[52] U.S. Cl. ............................ 474/119; 474/130; 254/250
[58] Field of Search ..................................... 474/101, 119, 474/130; 254/243, 244, 250

[56] References Cited

U.S. PATENT DOCUMENTS

| | | | |
|---|---|---|---|
| D. 289,134 | 4/1987 | Hodges | D8/44 |
| D. 314,894 | 2/1991 | Jacobs | D8/14 |
| 248,587 | 10/1881 | Gray | 474/130 |
| 433,825 | 8/1890 | Scheuerle | 474/130 |
| 1,151,013 | 8/1915 | Himes | 254/250 X |
| 3,574,342 | 4/1971 | Berns | 254/243 |
| 3,679,176 | 7/1972 | Campbell | 254/54 |
| 3,869,934 | 3/1975 | Pierce | 74/242.12 |
| 4,244,559 | 1/1981 | Mote | 254/129 |
| 4,437,648 | 3/1984 | Thorn et al. | 254/93 R |

*Primary Examiner*—Roger J. Schoeppel

[57] ABSTRACT

A belt installation and removal tool is provided for installing and removing a belt on a pulley and includes a handle assembly which includes a hand-grip portion, an extension portion connected to the hand-grip portion, and a finger-containing portion connected to the extension portion. A first finger and a second finger are connected to the finger-containing portion of the handle assembly. A spacer element is connected to the finger-containing portion of the handle assembly and is located between the first finger and the second finger. The spacer element projects a spacer distance out from the finger-containing portion so that the fingers extend completely past the belt. The finger-containing portion includes a reception area for receiving a third finger. The third finger includes a knurled portion which facilitates gripping of the third finger. More specifically, the finger-containing portion of the handle assembly can include a plurality of reception areas arrayed at intervals longitudinally along the finger-containing portion. Each of the reception areas includes internal threads. The third finger includes complementary external threads for screwing into the internal threads of the reception areas. The hand-grip portion includes a hollow chamber for storing the third finger. The hand-grip portion includes a screw cap for capping the hollow chamber.

8 Claims, 3 Drawing Sheets

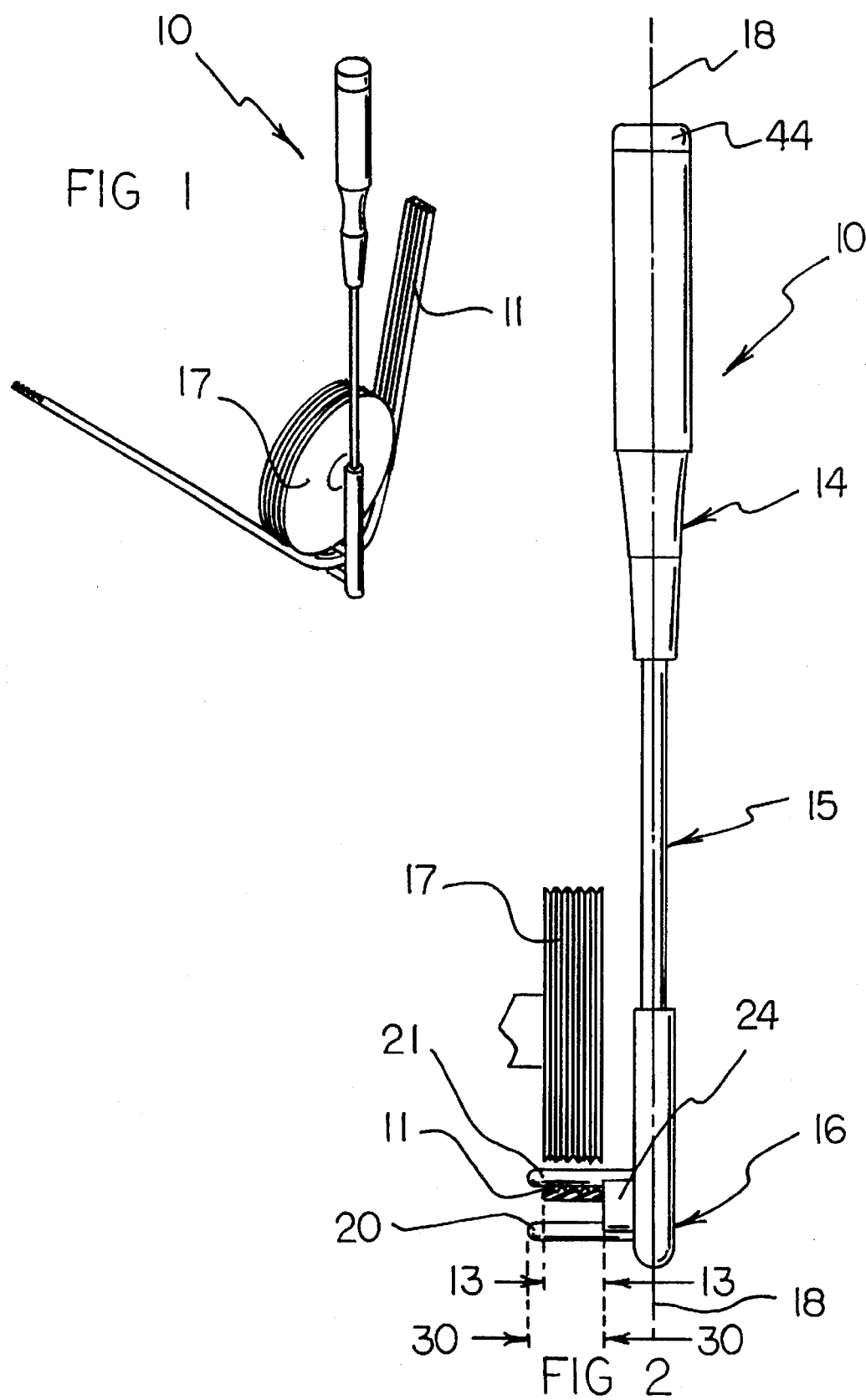

BELT INSTALLATION AND REMOVAL TOOL

BACKGROUND OF THE INVENTION

1. Field of the Invention

The present invention relates generally to hand tools and, more particularly, to a hand tool especially adapted for installing and removing endless belts on an array of pulleys.

2. Description of the Prior Art

Endless belts are used on pulleys in a wide variety of applications. In automotive vehicles, belts are used to transmit power from the engine to the alternator, to the air conditioner compressor, and often to the water pump. Over time, the belts often undergo wear and tear and deterioration. As a result, the belt should be changed before it breaks and fails to perform its power transfer functions.

To remove an endless belt from an array of pulleys, one pulley is usually loosened to relieve tension off of the belt. Once belt tension is relieved off of the belt, the belt must be lifted radially out of each pulley and then moved laterally away from each pulley. Often, clearances between pulleys and adjacent components or structures under the hood of the automotive vehicle are relatively small. The clearances are often too small for a mechanic to place his hand in those clearances. Therefore, tools have been devised for aiding in installation and removal of endless belts from pulleys wherein the tools have a relatively thin profile and are able to fit into clearances between pulleys and adjacent components or structures under the hood of the automotive vehicle.

One such known belt installation and removal tool has a long handle and two fingers projecting from the bottom of the handle. The fingers have a length which is shorter than the width of the endless belt. Many endless belts have an inner belt surface which includes a plurality of alternating peaks and valleys. In using such a known tool, if the handle of the tool is not held at 90 degrees with respect to the belt, the fingers of the tool can get caught in valleys between the peaks. As a result, the tool can pull the belt back off of the pulley. In this respect, it would be desirable if a belt installation and removal tool had fingers which were longer than the width of the belt.

In using the known belt installation and removal tool described above, a side edge of the belt directly contacts the handle of the tool when the tool is used with the belt. For pulleys that do not have edge flanges, the use of such a known belt installation and removal tool may be satisfactory. However, there are a number of pulleys for air conditioner compressors and for crankshafts which have one-half inch flanges on the outside edges of the pulleys. With the such flanged pulleys, the known belt installation and removal tool cannot be satisfactorily used. In this respect, it would be desirable if a belt installation and removal tool can be satisfactorily used with pulleys that have flanges of up to one-half inch.

Still other features would be desirable in a belt installation and removal tool. Endless belts come in a variety of thicknesses for a variety of applications. In this respect, it would be desirable if a belt installation and removal tool had adjustable features for adjusting the tool for belts having a range of thicknesses.

In using a belt installation and removal tool that employs belt-engaging fingers, the fingers often receive great mounts of wear and tear. In this respect, it would be desirable if a belt installation and removal tool had easily removable and replaceable belt-engaging fingers. Similarly, it would be desirable if a belt installation and removal tool had a provision for carrying an extra belt-engaging finger along with the tool.

Environments in which endless belts are removed and installed are often greasy and oily environments. As a result, it may be difficult to install or remove an extra belt-engaging finger. In this respect, it would be desirable if a belt installation and removal tool had an extra belt-engaging finger that had a provision aiding in its installation and removal in greasy and oily environments.

As a matter of interest, the following U.S. patents are known which disclose devices for tightening endless belts on an array of pulleys: U.S. Pat. Nos. 3,679,176; 3,869,934; 4,244,559; 4,437,648; U.S. Pat. No. Des. 289,134; and U.S. Pat. No. Des. 314,894.

Thus, while the foregoing body of prior art indicates it to be well known to use belt installation and removal tools, the prior art described above does not teach or suggest a belt installation and removal tool which has the following combination of desirable features: (1) has belt-engaging fingers which are longer than the width of the belt; (2) can be satisfactorily used with pulleys that have flanges of up to one-half inch; (3) has adjustable features for adjusting the tool for belts having a range of thicknesses; (4) has easily removable and replaceable belt-engaging fingers; (5) has a provision for carrying an extra belt-engaging finger along with the tool; and (6) has an extra belt-engaging finger that has a provision aiding in its installation and removal in greasy and oily environments. The foregoing desired characteristics are provided by the unique belt installation and removal tool of the present invention as will be made apparent from the following description thereof. Other advantages of the present invention over the prior art also will be rendered evident.

SUMMARY OF THE INVENTION

To achieve the foregoing and other advantages, the present invention, briefly described, provides a belt installation and removal tool for installing and removing a belt, that has a belt width, on a pulley or an array of pulleys. The belt installation and removal tool includes a handle assembly which includes a hand-grip portion, an extension portion connected to the hand-grip portion, and a finger-containing portion connected to the extension portion. The hand-grip portion, the extension portion, and the finger-containing portion are arranged along a longitudinal axis. A first finger and a second finger are connected to the finger-containing portion of the handle assembly, wherein each of the first finger and the second finger includes a finger axis which is substantially perpendicular to the longitudinal axis of the handle assembly. The first finger and the second finger lie in a common finger plane.

A spacer element is connected to the finger-containing portion of the handle assembly. The spacer element is located between the first finger and the second finger. The spacer element occupies a portion of space between the first finger and the second finger. The spacer element projects a spacer distance out from the finger-containing portion, wherein ends of the first finger and the second finger project a finger end distance beyond the spacer distance from the finger-containing portion. The finger end distance is greater than the belt width.

The extension portion is connected to the finger-containing portion by a threaded connection. The extension portion and the hand-grip portion are formed as a unified, integrated structure. The finger-containing portion includes a reception area for receiving a third finger. The third finger includes a knurled portion which facilitates gripping of the third finger. More specifically, the finger-containing portion of the handle assembly can include a plurality of reception areas arrayed at intervals longitudinally along the finger-containing portion. Each of the reception areas includes internal threads. The third finger includes complementary external threads for screwing into the internal threads of the reception areas. The hand-grip portion includes a hollow chamber for storing the third finger. The hand-grip portion includes a screw cap for capping the hollow chamber.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved belt installation and removal tool which has all of the advantages of the prior art and none of the disadvantages.

It is another object of the present invention to provide a new and improved belt installation and removal tool which may be easily and efficiently manufactured and marketed.

It is a further object of the present invention to provide a new and improved belt installation and removal tool which is of durable and reliable construction.

An even further object of the present invention is to provide a new and improved belt installation and removal tool which is susceptible of a low cost of manufacture with regard to both materials and labor, and which accordingly is then susceptible of low prices of sale to the consuming public, thereby making such belt installation and removal tool available to the buying public.

Still yet a further object of the present invention is to provide a new and improved belt installation and removal tool which has belt-engaging fingers which are longer than the width of the belt.

Still another object of the present invention is to provide a new and improved belt installation and removal tool that can be satisfactorily used with pulleys that have flanges of up to one-half inch.

Yet another object of the present invention is to provide a new and improved belt installation and removal tool which has adjustable features for adjusting the tool for belts having a range of thicknesses.

Even another object of the present invention is to provide a new and improved belt installation and removal tool that has easily removable and replaceable belt-engaging fingers.

Still a further object of the present invention is to provide a new and improved belt installation and removal tool which has a provision for carrying an extra belt-engaging finger along with the tool.

Yet another object of the present invention is to provide a new and improved belt installation and removal tool that has an extra belt-engaging finger that has a provision aiding in its installation and removal in greasy and oily environments.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the belt installation and removal tool of the invention in use with an endless belt and a pulley.

FIG. 2 is an enlarged front view of the embodiment of the belt installation and removal tool shown in FIG. 1.

DESCRIPTION OF THE PREFERRED EMBODIMENT

Figure 3:
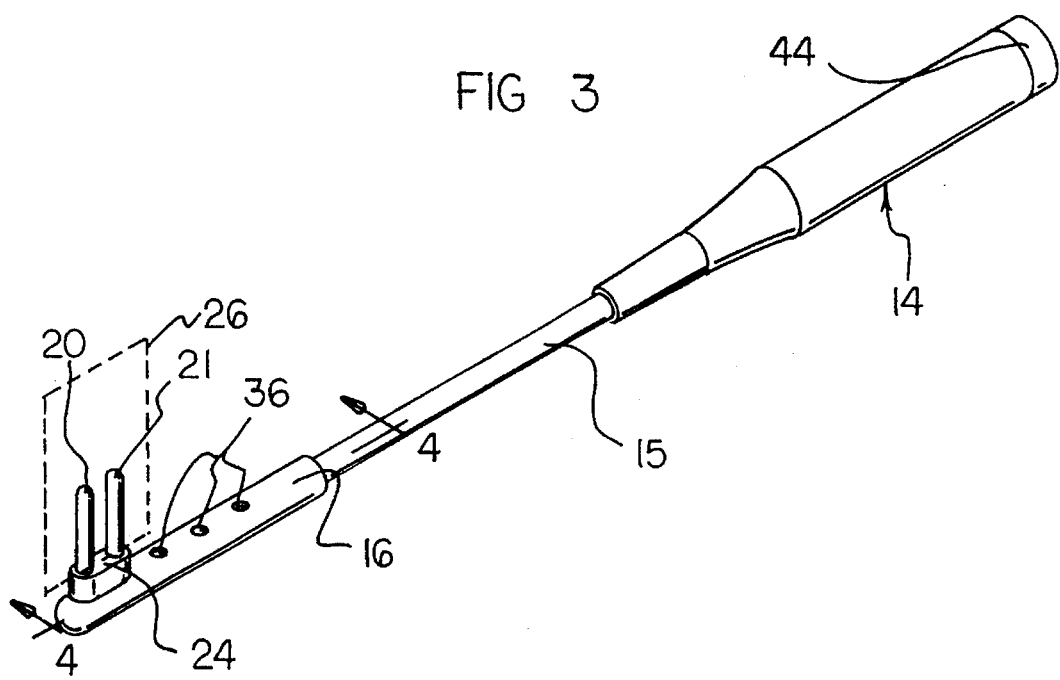
FIG. 3 is an enlarged perspective view of the embodiment of the belt installation and removal tool of FIG. 1 removed from the belt and the pulley.
Figure 4:
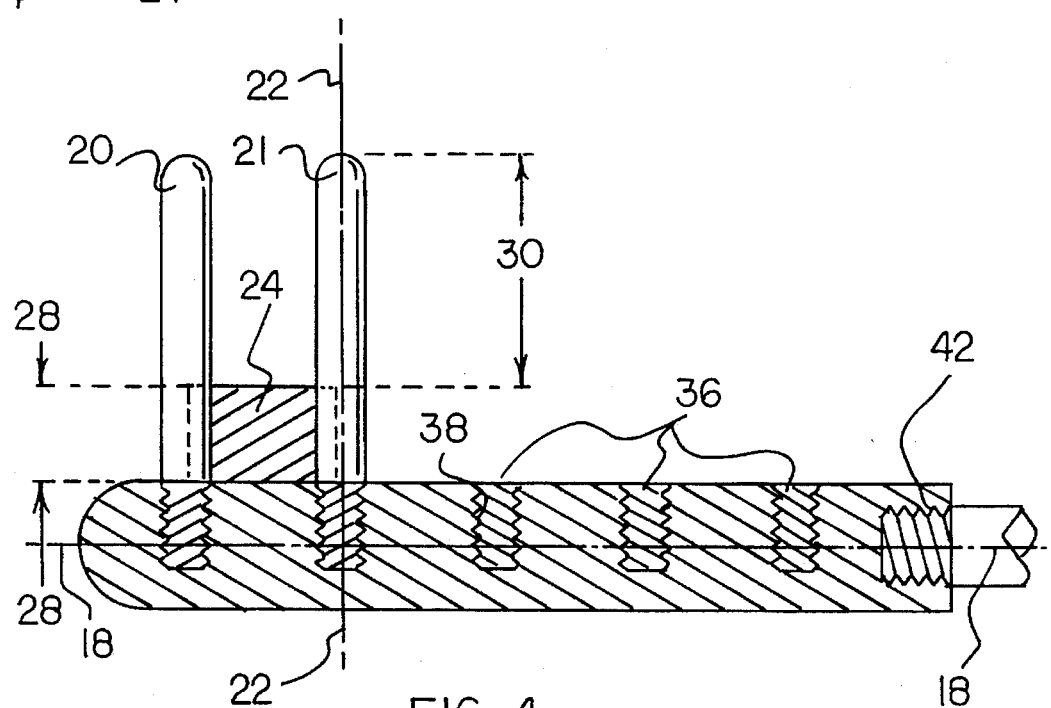
FIG. 4 is an enlarged cross-sectional view of the portion of the embodiment of the invention shown in FIG. 3 taken along line 4—4 of FIG. 3.

With reference to the drawings, a new and improved belt installation and removal tool embodying the principles and concepts of the present invention will be described.

Turning to FIGS. 1–5, there is shown an exemplary embodiment of the belt installation and removal tool of the invention generally designated by reference numeral 10. In its preferred form, belt installation and removal tool 10 is provided for installing and removing a belt 11, that has a belt width 13, on a pulley 17 in an array of pulleys. The belt installation and removal tool 10 includes a handle assembly 12 which includes a hand-grip portion 14, an extension portion 15 connected to the hand-grip portion 14, and a finger-containing portion 16 connected to the extension portion 15. The hand-grip portion 14, the extension portion 15, and the finger-containing portion 16 are arranged along a longitudinal axis 18. A first finger 20 and a second finger 21 are connected to the finger-containing portion 16 of the handle assembly 12, wherein each of the first finger 20 and the second finger 21 includes a finger axis 22 which is substantially perpendicular to the longitudinal axis 18 of the handle assembly 12. The first finger 20 and the second finger 21 lie in a common finger plane 26.

A spacer element 24 is connected to the finger-containing portion 16 of the handle assembly 12. The spacer element 24 is located between the first finger 20 and the second finger 21. The spacer element 24 occupies a portion of space between the first finger 20 and the second finger 21. The spacer element 24 projects a spacer distance 28 out from the finger-containing portion 16, wherein ends of the first finger 30 bend the second finger 21 project a finger end distance 30 beyond the spacer distance 28 from the finger-containing portion 16. The finger end distance 30 is greater than the belt width 13. Because the finger end distance 30 is greater than the belt width 13, the problems in using the prior art device which has a shorter finger, discussed above, are avoided.

The extension portion 15 is connected to the finger-containing portion 16 by a threaded connection 42. The extension portion 15 and the hand-grip portion 14 are formed as a unified, integrated structure. The finger-containing portion 16 includes a reception area 36 for receiving a third finger 34. The third finger 34 includes a knurled portion 46 which facilitates gripping of the third finger 34. More specifically, the finger-containing portion 16 of the handle assembly 12 can include a plurality of reception areas 36 arrayed at intervals longitudinally along the finger-containing portion 16. Each of the reception areas 36 includes internal threads 38. The third finger 34 includes complementary external threads 40 for screwing into the internal threads 38 of the reception areas 36. The hand-grip portion 14 includes a hollow chamber 32 for storing the third finger 34. The hand-grip portion 14 includes a screw cap 44 for capping the hollow chamber 32.

In using the belt installation and removal tool 10 of the invention, to remove a belt 11 from a pulley 17, a tensioner device (not shown), which is generally present to exert tension on the belt 11, is loosened. The hand-grip portion 14 of the handle assembly 12 is grasped by an operator, and the belt installation and removal tool 10 is maneuvered so that the first finger 20 and the second finger 21 are placed around the belt 11 so that the first finger 20 is near the outside of the belt 11 and the second finger 21 is near the inside of the belt 11. Moreover, the spacer element 24 is placed against an edge of the belt 11. In this way, the first finger 20 and the second finger 21 straddle the belt width 13. Moreover, if a pulley 17 had a flange up to one-half inch in width. A spacer element 24 of one-half inch in length would permit the belt 11 to clear the flange.

Then, the belt installation and removal tool 10 is tilted so that the belt 11 is pinched between the second finger 21 and the second finger 21. With the belt 11 pinched in this way, the belt 11 can be lifted radially or pushed radially out of contact with one of the pulleys that the belt 11 is threaded around. Has removed the belt from one pulley 17, it is then easy to remove the belt 11 from the remaining pulleys.

In reversing the process, to install a belt 11 on a pulley 17, the hand-grip portion 14 of the handle assembly 12 is gasped by an operator, and the belt installation and removal tool 10 is maneuvered so that the first finger 20 and the second finger 21 are placed around the belt 11 so that the first finger 20 is near the outside of the belt 11 and the second finger 21 is near the inside of the belt 11. Moreover, the spacer element 24 is placed against an edge of the belt 11. In this way, the first finger 20 and the second finger 21 straddle the belt width 13. Then, the belt installation and removal tool 10 is tilted so that the belt 11 is pinched between the second finger 21 and the second finger 21. With the belt 11 pinched in this way, the belt 11 can be moved sideways with respect to a pulley 17 and then pushed radially into contact with one of the pulleys that the belt 11 is threaded around. After the belt 11 is installed on all of the pulleys that the belt 11 is threaded around, the tensioning device is retightened.

Figure 5:
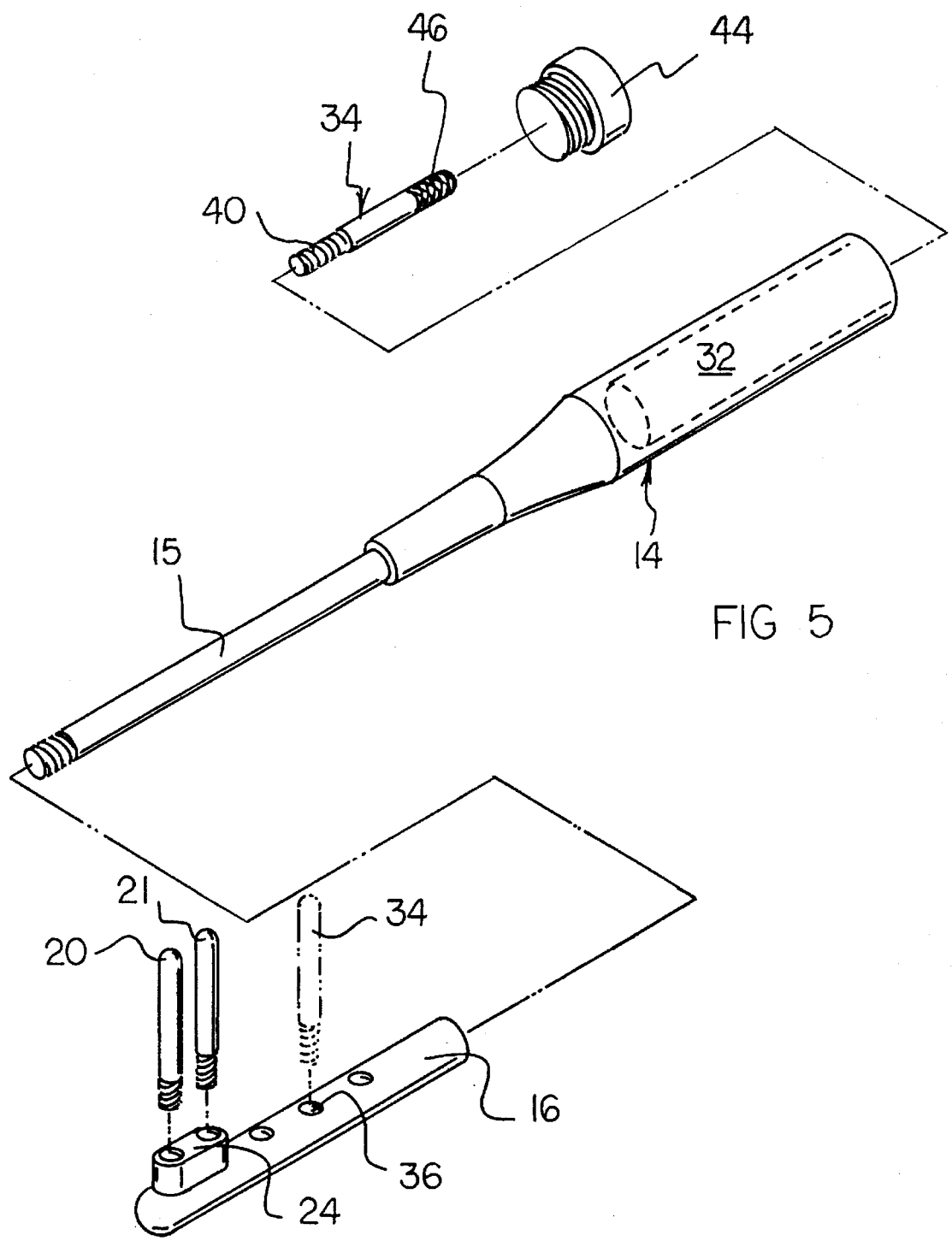
FIG. 5 is an exploded perspective view of the embodiment of the invention shown in FIG. 3.

If desired, as shown in FIG. 5, the third finger 34 can be screwed into a selected one of the reception areas 36 arrayed along the finger-containing portion 16 of the handle assembly 12. The knurled portion 46 of the third finger 34 can be used to grasp the third finger 34. When the third finger 34 is not in use, the screw cap 44 is removed from the hand-grip portion 14, and the third finger 34 is stored in the hollow chamber 32 inside the hand-grip portion 14. Then, the screw cap 44 is screwed back onto the hand-grip portion 14.

The components of the belt installation and removal tool of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved belt installation and removal tool that is low in cost, relatively simple in design and operation, and which has belt-engaging fingers which are longer than the width of the belt. With the invention, a belt installation and removal tool is provided which can be satisfactorily used with pulleys that have flanges of up to one-half inch. With the invention, a belt installation and removal tool is provided which has adjustable features for adjusting the tool for belts having a range of thicknesses. With the invention, a belt installation and removal tool is provided which has easily removable and replaceable belt-engaging fingers. With the invention, a belt installation and removal tool is provided which has a provision for carrying an extra belt-engaging finger along with the tool. With the invention, a belt installation and removal tool is provided which has an extra belt-engaging finger that has a provision aiding in its installation and removal in greasy and oily environments.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A belt installation and removal tool for installing and removing a belt having a belt width on a pulley, comprising:

a handle assembly which includes a hand-grip portion, an extension portion connected to said hand-grip portion, and a finger-containing portion connected to said extension portion, wherein said hand-grip portion, said extension portion, and said finger-containing portion are arranged along a longitudinal axis, a first finger and a second finger connected to said finger-containing portion of said handle assembly, wherein each of said first finger and said second finger includes a finger axis which is substantially perpendicular to said longitudinal axis of said handle assembly, wherein said first finger and said second finger lie in a common finger plane, and a spacer element connected to said finger-containing portion of said handle assembly, wherein said spacer element is located between said first finger and said second finger, wherein said spacer element occupies a portion of space between said first finger and said second finger, wherein said spacer element projects a spacer distance out from said finger-containing portion, wherein ends of said first finger and said second finger project a finger end distance beyond said spacer distance from said finger-containing portion, wherein said finger end distance is greater than the belt width, further including a third finger, wherein said finger-containing portion includes a reception area for receiving said third finger.

2. The tool of claim 1 wherein said extension portion is connected to said finger-containing portion by a threaded connection.

3. The tool of claim 1 wherein said extension portion and said hand-grip portion are formed as a unified, integrated structure.

4. The tool of claim 1 wherein said hand-grip portion includes a hollow chamber for storing said third finger.

5. The tool of claim 4, wherein said hand-grip portion includes a screw cap for capping said hollow chamber.

6. The tool of claim 1 wherein said third finger includes a knurled portion which facilitates gripping of said third finger.

7. A belt installation and removal tool for installing and removing a belt having a belt width on a pulley, comprising:

a handle assembly which includes a hand-grip portion, an extension portion connected to said hand-grip portion, and a finger-containing portion connected to said extension portion, wherein said hand-grip portion, said extension portion, and said finger-containing portion are arranged along a longitudinal axis, a first finger and a second finger connected to said finger-containing portion of said handle assembly, wherein each of said first finger and said second finger includes a finger axis which is substantially perpendicular to said longitudinal axis of said handle assembly, wherein said first finger and said second finger lie in a common finger plane, and a spacer element connected to said finger-containing portion of said handle assembly, wherein said spacer element is located between said first finger and said second finger, wherein said spacer element occupies a portion of space between said first finger and said second finger, wherein said spacer element projects a spacer distance out from said finger-containing portion, wherein ends of said first finger and said second finger project a finger end distance beyond said spacer distance from said finger-containing portion, wherein said finger end distance is greater than the belt width wherein said finger-containing portion of said handle assembly includes a plurality of reception areas arrayed at intervals longitudinally along said finger-containing portion, each of said plurality of reception areas being adapted to receive a third finger, respectively.

8. The tool of claim 7 wherein each of said reception areas includes internal threads and wherein said third finger includes complementary external threads for screwing into said internal threads of said reception areas.

* * * * *